United States Patent
Ertimo et al.

(10) Patent No.: US 10,681,562 B1
(45) Date of Patent: Jun. 9, 2020

(54) MEASUREMENT-BASED WIRELESS COMMUNICATIONS NETWORK DESIGN

(71) Applicant: NOKIA SOLUTIONS AND NETWORKS OY, Espoo (FI)

(72) Inventors: Riku Tuomas Ertimo, Espoo (FI); Jyri Sakari Lamminmäki, Helsinki (FI); Jarkko Kalervo Itkonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/685,199

(22) Filed: Nov. 15, 2019

(30) Foreign Application Priority Data

Nov. 29, 2018 (FI) .................................. 20186021

(51) Int. Cl.
*H04W 16/18* (2009.01)
*H04W 24/10* (2009.01)
*H04B 17/327* (2015.01)

(52) U.S. Cl.
CPC .......... *H04W 16/18* (2013.01); *H04B 17/327* (2015.01); *H04W 24/10* (2013.01)

(58) Field of Classification Search
CPC ..... H04W 16/18; H04W 24/10; H04B 17/327
See application file for complete search history.

(56) References Cited

U.S. PATENT DOCUMENTS

| 7,903,625 | B1 * | 3/2011 | Srinivas | H04W 48/02 370/338 |
|---|---|---|---|---|
| 2004/0198234 | A1 | 10/2004 | Wacker et al. | |
| 2007/0097939 | A1 | 5/2007 | Nylander et al. | |
| 2012/0329449 | A1 | 12/2012 | Das et al. | |

(Continued)

FOREIGN PATENT DOCUMENTS

| WO | 2015/176996 A1 | 11/2015 |
|---|---|---|
| WO | WO 2017/039521 A1 | 3/2017 |

OTHER PUBLICATIONS

Communication of Acceptance under section 29a of Patents Decree dated Jul. 3, 2019 corresponding to Finnish Patent Application No. 20186021.

(Continued)

*Primary Examiner* — Christopher M Brandt
(74) *Attorney, Agent, or Firm* — Squire Patton Boggs (US) LLP

(57) ABSTRACT

According to an aspect, there is provided a network deployment analysis apparatus. It is assumed that information on a wireless communications network of first and second types are maintained in a database. The network deployment analysis apparatus causes performing downlink measurements on reference signals transmitted by one or more access nodes in the wireless communications network of the first type using a plurality of terminal devices in said network. In response to receiving information on results of the downlink measurements, the network deployment analysis apparatus calculates one or more values of traffic absorption capability associated with one or more potential cell deployments in a wireless communications network of the second type based on the received information and the information maintained in the database. The results of the calculating are outputted to a user device for facilitating network planning of the wireless communications network of the second type.

20 Claims, 8 Drawing Sheets

(56) References Cited

U.S. PATENT DOCUMENTS

| | | | |
|---|---|---|---|
| 2013/0310048 A1 | 11/2013 | Hunukumbure et al. | |
| 2014/0031047 A1* | 1/2014 | Jovanovic | H04W 16/04 455/446 |
| 2014/0269312 A1* | 9/2014 | Combes | H04W 88/08 370/235 |
| 2015/0098446 A1* | 4/2015 | Ye | H04W 28/0226 370/331 |
| 2015/0117360 A1 | 4/2015 | Shen et al. | |
| 2016/0381591 A1 | 12/2016 | Lysejko et al. | |
| 2017/0041806 A1 | 2/2017 | Randall et al. | |
| 2017/0150365 A1* | 5/2017 | Goswami | H04W 16/18 |
| 2017/0230880 A1* | 8/2017 | Oroskar | H04W 36/22 |
| 2018/0062879 A1* | 3/2018 | Alexander | H04L 12/66 |
| 2018/0192297 A1 | 7/2018 | Chadaga et al. | |
| 2018/0270857 A1 | 9/2018 | Brisebois et al. | |

OTHER PUBLICATIONS

Office Action dated Feb. 14, 2019 corresponding to Finnish Patent Application No. 20186021.

Search Report dated Feb. 14, 2019 corresponding to Finnish Patent Application No. 20186021.

I. De La Bandera et al., "Improving Cell Outage Management Through Data Analysis," IEEE Wireless Communications IEEE, [online], Feb. 13, 2017, vol. 24, No. 4, pp. 113-119.

3GPP TS 37320 V15.0.0 (Jun. 2018), Technical Specification, 3rd Generation Partnership Project; Technical Specification Group Radio Access Network; Universal Terrestrial Radio Access (UTRA) and Evolved Universal Terrestrial Radio Access (E-UTRA); Radio Measurement collection for Minimization of Drive Tests (MDT); Overall description; Stage 2 (Release 15), Jul. 6, 2018.

ETSI TS 136 455 V13.0.0 (Jan. 2016); LTE; Evolved Universal Terrestrial Radio Access (E-UTRA); LTE Positioning Protocol A (LPPa) (3GPP TS 36.455 version 13.0.0 Release 13), Jan. 2016.

European Search Report dated Mar. 3, 2020 corresponding to European Patent Application No. 19211383.5.

* cited by examiner

MEASUREMENT-BASED WIRELESS COMMUNICATIONS NETWORK DESIGN

TECHNICAL FIELD

Various example embodiments relates to wireless communications.

BACKGROUND

The aim of radio network design is to define a set of site locations (i.e., access node locations) and their respective configurations so that the coverage and capacity requirements derived from the dimensioning (i.e., an initial phase of network planning) are met. This has typically been driven by planning tools that rely on radio wave propagation models such as Okumura-Hata and ray tracing models. However, the accuracy of the propagation models can be quite limited, especially in complex urban scenarios. Moreover, each cell can have different propagation characteristics defined by the surrounding environment, and often there are only a handful of propagation models tuned for particular scenarios available. Also, the accuracy of the antenna placement in the planning tool can further contribute to inaccuracies in the predictions. Therefore, there is a need for a more accurate way for performing radio network design capable of overcoming or alleviating at least some of the aforementioned problems.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method and a computer readable medium for evaluating potential cell deployments.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. The wireless communications network of the first type and the wireless communications network of the second type to be discussed below may, in some embodiments, be any wireless communications network listed in this paragraph.

Figure 1:
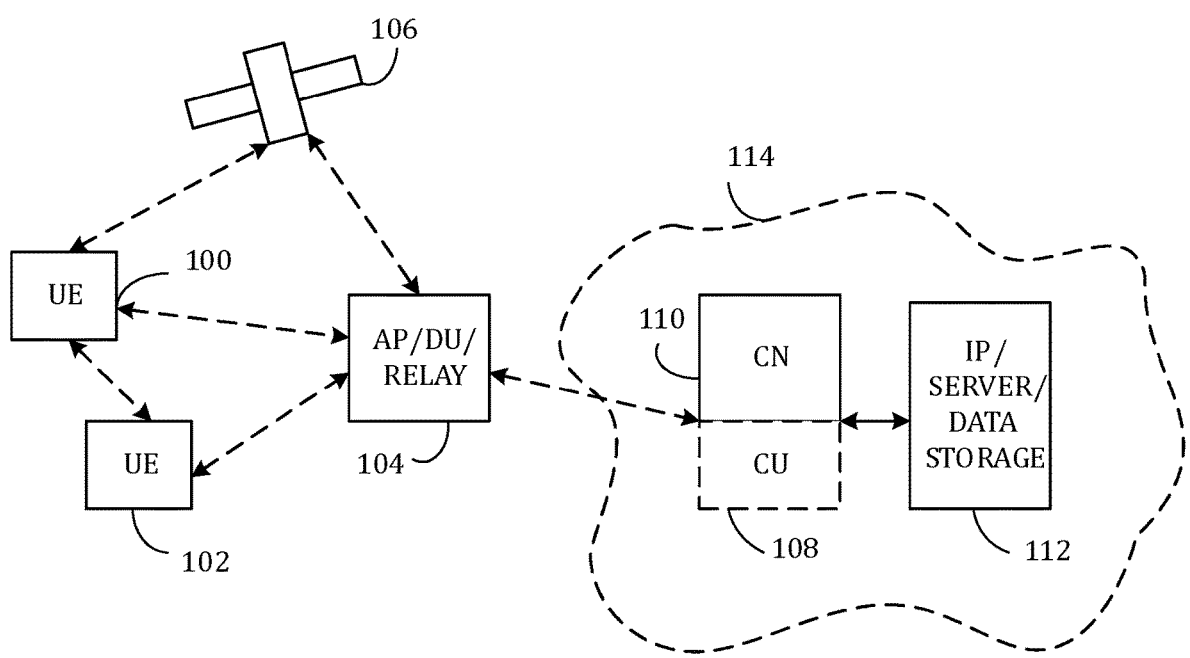
FIGS. 1 and 2 illustrates exemplary wireless communication systems.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Radio network design has traditionally been carried out using commercial planning software, such as Aircom Asset, Mentum Planet, or Atoll. They are typically based on predictions, meaning that the signal strength is predicted at a given location using mathematical models. From the predicted signal strength, it may be determined whether a required Quality of Service (QoS) level is achieved. Examples of the (radio wave) propagation models are Oku-mura-Hata, Walfish-Ikegami and ray tracing models.

The propagation models may be tuned in various ways, such as tuning the general parameters embedded in a given propagation model or tuning the various correction factors or parameters applied to a given propagation model, such as a clutter correction factor. Different environments such as open, forest, suburban, or urban areas have different correction factors. Urban areas have higher propagation losses compared to open areas, so higher attenuation factor is assigned to urban clutter type. While there are several tuning methods available, the inaccuracies in the predictions may be high, especially in urban environments. Additionally, each cell can have different propagation characteristics defined by the surrounding environment, and often there are only a handful of tuned models available. Also, the accuracy of the antenna placement in the planning tool contribute to inaccuracies in the predictions, including the fact that the near field of the antenna might be at least partially obstructed, in which case the antenna itself is not performing according to the conventional simplified antenna model.

The embodiments to be discussed below overcome and/or alleviate at least some of the problems described above by performing network planning by taking advantage of signal measurements in legacy communication networks, that is, in pre-5G communications networks such as LTE or 4G communications networks.

Figure 2:
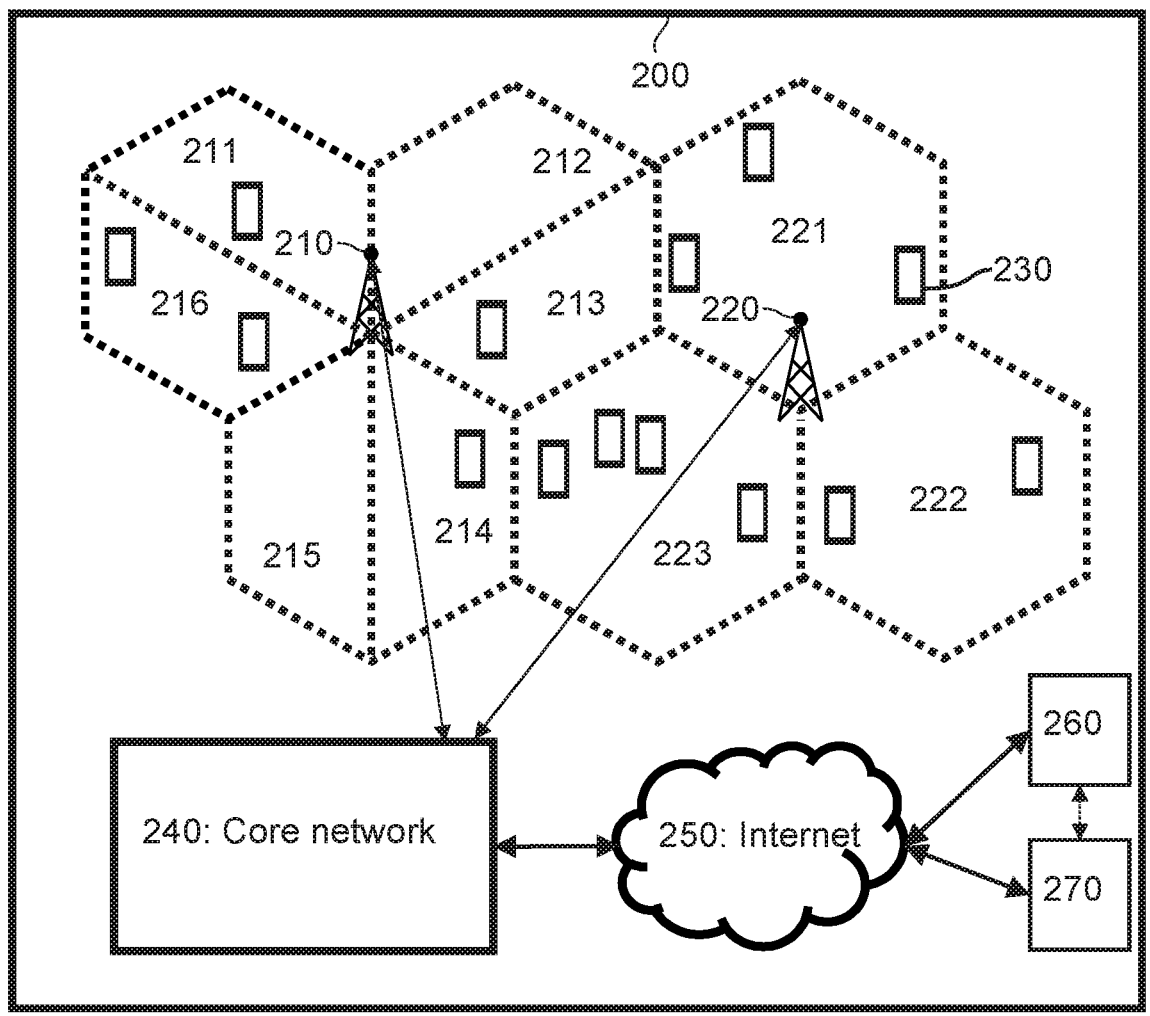

FIG. 2 illustrates another example of a simplified system architectures only showing some elements and functional entities, all being logical units, whose implementation may differ from what is shown. The connections shown in FIG. 2 are logical connections; the actual physical connections may be different. It is apparent to a person skilled in the art that the system typically comprises also other functions and structures than those shown in FIG. 2. The wireless communications system 200 may be the same communications system as illustrated in FIG. 1. Consequently, one or more of the elements shown in FIG. 1 may be included in the communications system of FIG. 2 and vice versa and the discussion in relation to FIG. 1 applies as such also to FIG. 2. The wireless communication system illustrated in FIG. 2 may be specifically a fourth generation (4G) wireless communications system or a LTE wireless communications system.

The illustrated communications system 200 may be a wireless communication system composed of one or more radio access networks of access nodes (e.g., eNBs) 210, 220, each providing and controlling one or more respective cells or sectors 211, 212, 213, 214, 215, 216, 221, 222, 223. Here, a sector refers to antenna direction on a cell site and a cell to a specific carrier inside a sector. In case of a single carrier configuration, the terms "cell" and "sector" may be equivalent. Specifically, the access node 210 may provide and control cells or sectors 211, 212, 213, 214, 215, 216 and the access node 220 may provide and control cells or sectors 221, 222, 223. In other words, the access node 210 corresponds to six-sector deployment, that is, it provides and controls six sectors surrounding the access node 210 while the access node 220 correspond to tri-sector deployment, that is, it provides and controls three sectors surrounding the access node 220. Each of the six or three sectors may be covered by a separate antenna or antenna array. In some embodiments, a single antenna array (that is, a MIMO antenna array) may be used to provide two or more beams, each beam covering a sector. The sectors may be at least partially overlapping with each other. In other embodiments, the number of sectors or cells covered by a given access node may be other than three or six (e.g., one). In some embodiments, the number of sectors covered by an access node may be equal for all access nodes within the communications system or network. While FIG. 2 illustrates only two access nodes 210, 220 for simplicity, in other embodiments a very large number of access nodes may be present.

In addition to the sectors or (macro) cells 211, 212, 213, 214, 215, 216, 221, 222, 223 shown in FIG. 2, the communications network may comprise one or more access nodes providing small cells (not shown in FIG. 2).

Each access node may provide one or more terminal devices (user equipment, UEs, or user devices) 230 with wireless access to other networks such as the Internet 250, either directly or via a core network 240. Each cell may comprise one or more terminal devices or no terminal devices at any given time. Each terminal device may be defined as described in relation to FIG. 1.

In the case of multiple access nodes in the communication network, the access nodes may be connected to each other with an interface. For example, LTE specifications call such an interface an X2 interface. Other wired or wireless communication methods between the access nodes may also be possible. The access nodes may be further connected via another interface to a mobility management entity (MME) in a core network 240.

As mentioned above, the wireless communications system 200 may correspond to a 4G or a LTE communications system or an older legacy communications system (e.g., 3G communications system). Another, possibly newer communications system (e.g., 5G communications system) may co-exist with the wireless communications system 200 or it may be only at a planning stage, that is, not yet deployed. The embodiments to be discussed below seek to facilitate the network planning for the 5G communications system or network by analyzing the performance of the legacy wireless communications system 200 and determining the performance achievable with different potential access node (or cell or source cell) deployments. The results of the analysis may be used, for example, to determine which potential cell deployment would provide the greatest overall benefit and/or determine which terminal devices would benefit most from a potential cell deployment. The term "cell deployment" may be defined, here and in the following, to correspond to deployment of a new cell of a new access node or a deployment of a new cell provided by an existing access node. Further, it is assumed that the wireless communications networks of the first and second types utilize the same or at least similar network layouts. Thus, the wireless communications network illustrated in FIG. 2 may correspond alternatively to the aforementioned newer wireless communications network currently in the planning stage or not fully deployed. However, it should be noted that as the propagation characteristics may be different in wireless communications network of the first and second types (e.g., due to different frequency band used), the two networks may not cover the same area.

The aforementioned analysis may be carried out by a separate network deployment analysis apparatus or system 260 connected to the Internet 250 as shown in FIG. 2. Alternatively, the network deployment analysis apparatus or system 260 may be comprised in the core network 240. In some embodiments, the network deployment analysis apparatus or system may be comprised in or connected to the operations support systems (OSS). In some embodiments, the network deployment analysis apparatus may correspond to a distributed computing or cloud computing system. The network deployment analysis apparatus 260 may comprise or be connected to a database for maintaining information on the current wireless communications network (or networks) and on the potential future wireless communications network (or networks). The network deployment analysis apparatus 260 may be connected to one or more networks other than Internet such as one or more intranets.

The system 200 may further comprise one or more user devices 270, each operated by a network planner. Here and in the following, the term "user device" is used predominantly when referring to devices operated by a network planner (i.e., element 270) while the term "terminal device" is used when referring to (user) devices in the (current) wireless communications network (i.e., element 230) operated by subscribers of the (current) wireless communications network. The one or more user devices 270 may be configured to receive information from the network deployment analysis apparatus or system 260. To enable this functionality, the one or more user devices 270 may be connected to the network deployment analysis apparatus 260 directly and/or via the Internet. The one or more user devices 270 may be configured to display the received information to the user (i.e., a network planner) to facilitate network planning and design. The one or more user devices 270 may be of any type of user device as listed in relation to FIG. 1.

In some embodiments, the network deployment analysis apparatus or system 260 and one or more user devices 270 may form a single entity, system or apparatus.

In the following discussion, the current wireless communications network (e.g., wireless communications network of FIG. 2) is called a wireless communications network of the first type and the wireless communications network yet to be deployed or at least not yet fully deployed (e.g., a "next generation" wireless communications network) is called a communications network of the second type. In some embodiments, the wireless communications network of the first type operates in a first frequency band and the wireless communications network of the second type operates in a second frequency band above (or in some alternative embodiments below) the first frequency band. In an embodiment, the wireless communications network of the first type is a 4G or LTE communications network and the wireless communications network of the second type is a 5G communications network.

Figure 3:
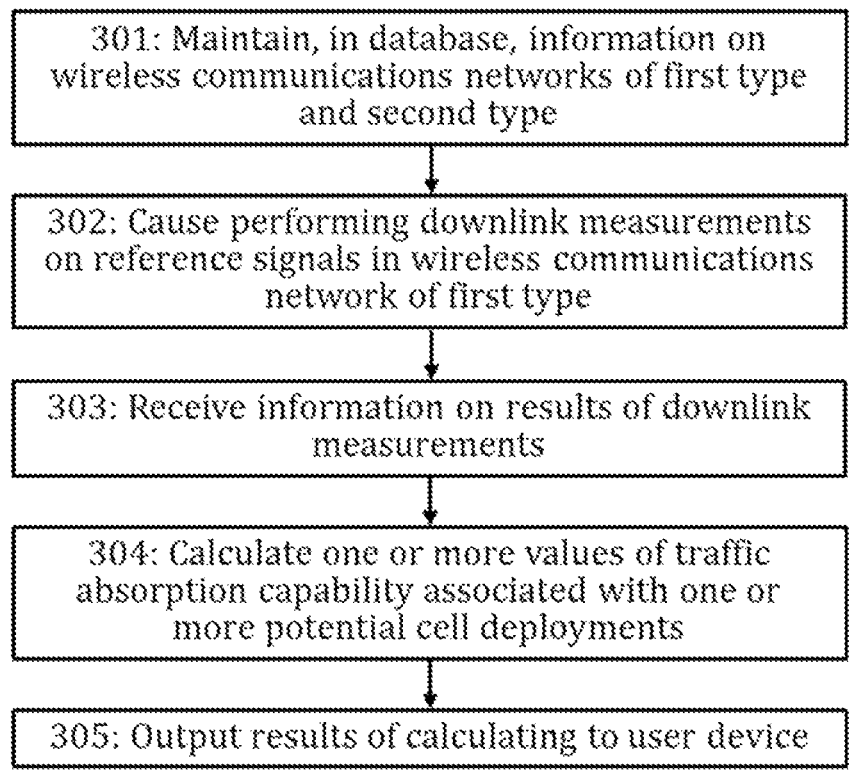
FIGS. 3, 4, 6, 8 and 10 illustrate exemplary processes according to embodiments.

FIG. 3 illustrates a process according to an embodiment for evaluating potential cell deployments for the wireless communications network of the second type (e.g., 5G) based on current state of the wireless communications network of the first type (e.g., 4G or LTE). The illustrated process may be performed by a network deployment analysis apparatus or system or specifically by the network deployment analysis apparatus 260 of FIG. 2. The wireless communications network of the first type to be discussed below may correspond to a wireless communications network illustrated in FIG. 1 and/or FIG. 2.

Referring to FIG. 3, one or more databases connected to or comprised in the network deployment analysis apparatus may initially maintain, in block 301, information on a wireless communications network of a first type and information on a wireless communications network of a second type. The wireless communications network of the second type may not yet be deployed, at least not fully. The information on the wireless communications network of the second type may comprise at least information on one or more potential cell deployments associated with one or more sectors or cells.

The information on the wireless communications network of the first type may comprise the following information or at least some of the following information. The information on the wireless communications network of the first type may comprise configuration management (CM) data of the wireless communications network of the first type. The configuration management data of the wireless communications network of the first type may comprise, for example, one or more parameters associated with the access nodes and/or cells of the wireless communications network of the first type such as frequency of operation, bandwidth, maximum transmission power and physical cell ID. Further, the information on the wireless communications network of the first type may comprise information on properties of the access nodes and associated cells in the wireless communications network of the first type. Said properties for each access node may comprise one or more of a location of the access node given, for example, as coordinates, a transmission power provided by the access node for each associated cell, bearings of one or more antennas associated with the access node and an antenna gain (maximum antenna gain and/or an antenna gain pattern) for the one or more antennas of the access node. Moreover, the information on the wireless communications network of the first type may comprise information on an antenna gain (maximum antenna gain and/or an antenna gain pattern) for one or more terminal devices in the wireless communications network of the first type. The information on the wireless communications network of the first type may also comprise one or more link budget parameters (e.g., 4G and/or LTE link budget parameters). The one or more link budget parameters may comprise at least one or more values of maximum allowed pathloss in the wireless communications network of the first type for satisfying one or more Quality of Service, QoS, criteria. Finally, the information on the wireless communications network of the first type may comprise measurement data, for example, in the form of previously measured reference signal received power (RSRP) values. Each RSRP value may correspond to a (downlink) measurement of the received power level in a LTE wireless communications network or in another wireless communications network of the first type. Alternatively or in addition, the information on the wireless communications network of the first type may comprise raw measurement data from which the measurement data (e.g., the RSRP data) may be derived. The raw measurement data may be, for example, operations support systems (OSS) performance management counter data or layer 3 data collection (L3DC) minimization of drive test (MDT) data acquired, respectively, through OSS performance measurements or L3DC MDT measurements in the wireless communications network of the first type.

The information on the wireless communications network of the second type may comprise the following information or at least some of the following information. As mentioned above, the information on the wireless communications network of the second type may comprise at least information on one or more potential cell deployments associated with one or more sectors or cells. This information may be similar to the information on properties of the access node described in the previous paragraph. Namely, the information on one or more potential cell deployments may comprise, for each potential cell deployment, information on one or more of a location of the associated access node (i.e., cell site) given, for example, as coordinates, a transmission power provided by the access node for the associated cell, bearings of one or more antennas associated with the access node and an antenna gain (maximum antenna gain and/or an antenna gain pattern) for the one or more antennas of the access node. Moreover, the information on the wireless communications network of the second type may comprise information on an antenna gain (maximum antenna gain and/or an antenna gain pattern) for one or more terminal devices in the wireless communications network of the second type. The information on the wireless communications network of the second type may also comprise one or more link budget parameters (e.g., 5G link budget parameters). The one or more link budget parameters may comprise at least one or more values of maximum allowed pathloss in the wireless communications network of the second type for satisfying one or more Quality of Service, QoS, criteria. The information on the wireless communications network of the second type may also comprise configuration management (CM) data of the wireless communications network of the second type (if any exist). Finally, the information on the wireless communications network of the second type may comprise one or more pre-defined propagation parameters quantifying differences in radio propagation in wireless communications network of the first and the second type. The one or more pre-defined propagation parameters may comprise, for example, one or more of a first propagation parameter for compensating for a difference in free-space loss, a second propagation parameter for compensating for a difference in penetration loss and a third propagation parameter for providing supplementary compensation.

The network deployment analysis apparatus causes, in block 302, performing downlink measurements on reference signals transmitted by one or more access nodes in the wireless communications network of the first type using a plurality of terminal devices in the wireless communications network of the first type. The plurality of terminal devices may be associated with at least one cell (or sector) defined by a potential cell deployment for the wireless communications network of the second type. In other words, measurements are performed in order to determine how well the current wireless communications network is serving the cell to be potentially covered by a future cell deployment of the wireless communications network of the second type. Each terminal device may be configured to measure at least received signal (power) level and/or signal quality. Each terminal device may perform one or more downlink measurements. The network deployment analysis apparatus receives, in block 303, information on results of the downlink measurements comprising at least downlink reference signal received power (RSRP) measured by each of the plurality of terminal devices. The information on results of the downlink measurements may comprise, for each terminal device, one or more measurements of the RSRP (and/or other parameters, such as downlink reference signal received quality, listed below). Alternatively, the information on results of the downlink measurements may comprise raw data from which the RSRP values may be calculated or extracted. The information on results of the downlink measurements may further comprise, for example, information on downlink reference signal received quality (RSRQ), downlink received signal strength indicator (RSSI), Global Positioning system (GPS) information relating to the location of the terminal device, target cell N Physical Cell Identifier (PCI)/Evolved-UTRA Absolute Radio Frequency Number (EARFCN) and/or information on the source cell (or sector) comprising one or more of a source cell identifier, source cell RSRP, source cell RSRQ and source cell timing advance. Some of said information is discussed in more detail in relation to further embodiments.

The terminal device measurements may be based on the layer-3 data collection minimization of drive test (L3DC MDT) measurements. As the name implies, the intention of L3DC MDT measurements is to minimize the need for drive tests, that is, tests where a testing vehicle is driven around a pre-defined route in order to measure various network performance metrics (e.g, cell power and/or interference) or terminal device performance metrics (e.g, call drop, throughput, handover performance and/or cell reselection performance). In L3DC MDT measurements, instead of employing a separate testing vehicle any terminal device around the area of interest (e.g., a particular cell or sector or a planned cell or sector) to perform measurements (similar to measurements which would be performed by the testing vehicle), store the result to a memory of the terminal device and subsequently report results of the measurements to an access node.

The causing of performing the downlink measurements in block 302 for a particular sector or cell, in the case of L3DC MDT measurements, may comprise configuring the access node associated with said cell to transmit a configuration message (e.g., a Radio Resource Control, RRC, configuration message) and subsequently a reference signal (e.g., a Channel State Information Reference Signal, CSI-RS) to one or more terminal device within said sector or cell. Said configuration message configures each terminal device to receive (or measure) reference signals transmitted by the access node at a given time (or periodically) using a particular frequency band. Once the reference signal has been received by a terminal device (and stored to a memory of the terminal device), said terminal device may report the measurement results back to the access node. Each access node may further report the measurement results to the core network and consequently to the network deployment analysis apparatus (block 303). In some embodiments, the terminal device may, before reporting the measurement results to the access node, transmit a message (e.g., a RRC Connection Setup Complete message or a UE Information Response message) informing the access node that measurement results are available. The actual reporting of the measurement results may be initiated only after the access node requests (e.g., using a UE Information Request message) for the measurement results. The measurement results may be transmitted, for example, as an UE Information Response message. The RSRP level for each user may be obtained periodically with a pre-defined interval, typically a few seconds.

Alternatively or in addition, the terminal device measurements may be based on operations support system (OSS) performance management (PM) data collection. OSS PM may be defined as the collection, processing and distribution of performance related information that is periodically collected from a wireless communications network. Each network element in a wireless communications network is typically able to produce a large number (e.g., from 40 up to 4000) of different raw counters that describe its behavior. Only a subset of all the raw counters may be reported to the network deployment analysis apparatus. Different raw counters may be mathematically combined into performance indicators. A set of available performance indicators corresponding to key performance indicators, KPIs may be reported the network deployment analysis apparatus.

The performance management data may be collected from a plurality of different sources comprising (but not limited to) fault/alarm related data (events/alarms sent by a network element in case of a failure or problem), performance related data (data about the performance and other aspects of the network periodically produced by network elements), active measurements/synthetic probes (traffic is injected into the network, e.g., by sending an SMS or MMS, and the network behavior in relation to the injected data is measured), non-intrusive probes (data on a specific type of calls collected, for example, from roaming subscribers typically by equipment other than the network elements themselves such as link analyzers) and/or terminal based data (the mobile phone itself collects data about the network or the services and report this data back to an access node).

In response to receiving the information on results of the downlink measurements in block 303, the network deployment analysis apparatus calculates, in block 304, one or more values of traffic absorption capability associated with the one or more potential cell deployments based on the received information and the information on the wireless communications network of the first type and the second type. The traffic absorption capability may be defined as the amount of traffic volume a cell of a wireless communications network of the second type if deployed is able to absorb from the wireless communications network of the first type. How the traffic absorption capability is calculated is discussed in more detail in relation to FIG. 4. The network deployment analysis apparatus outputs, in block 305, results of the calculating (i.e., values of the traffic absorption capability and possibly results of one or more secondary calculations) to a user device (or a terminal device) for facilitating network planning of the wireless communications network of the second type. Consequently or subsequently, the results of the calculating may be displayed on a screen of the user device.

Figure 4:
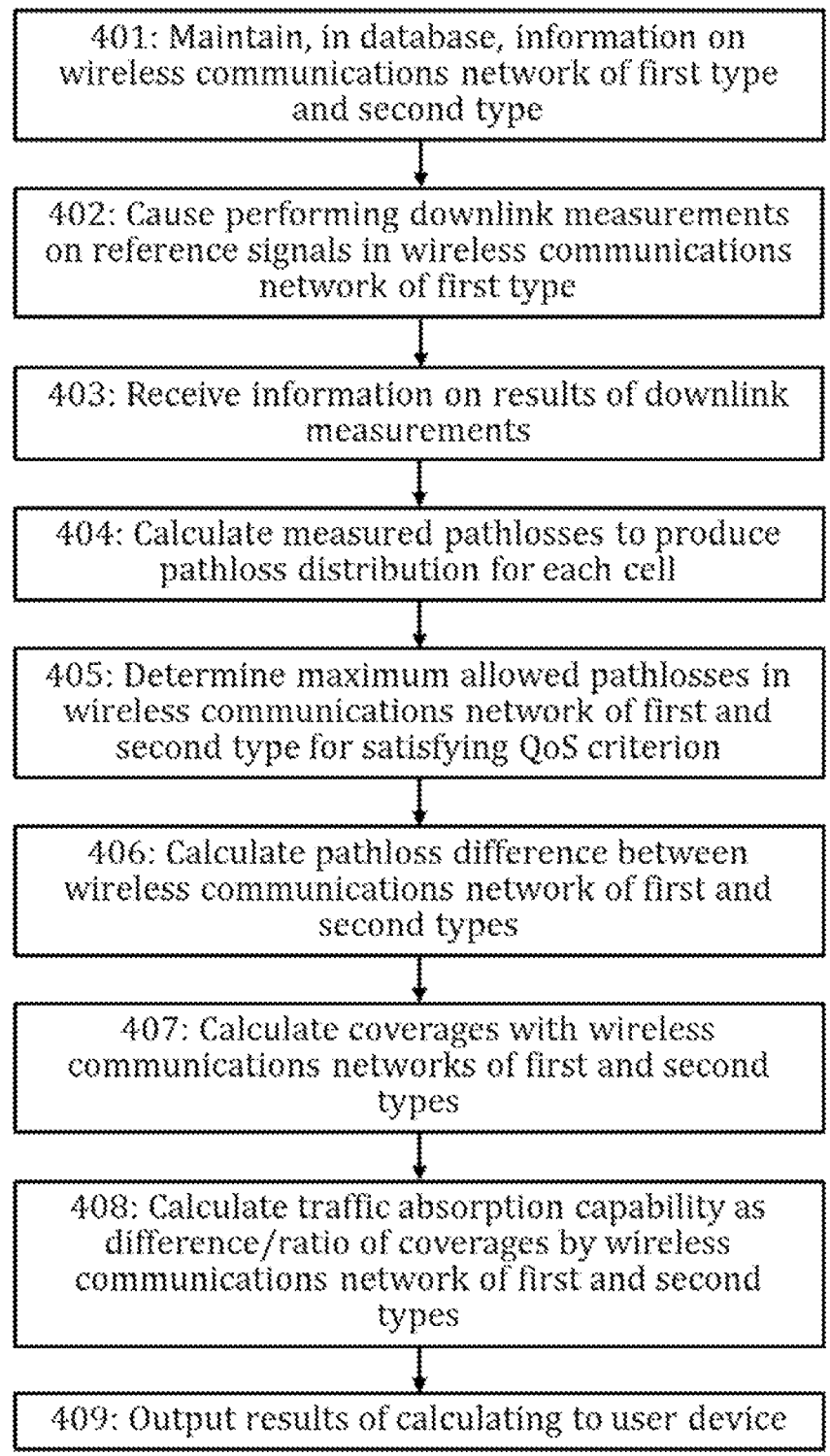

FIG. 4 illustrates another process according to an embodiment for evaluating potential cell deployments for the wireless communications network of the second type (e.g., 5G network) based on current state of the wireless communications network of the first type (e.g., 4G or LTE network). Specifically, this embodiment provides one exemplary detailed process for calculating the traffic absorption capability. Similar to the previous illustrated embodiment, the illustrated process of FIG. 4 may be performed by a network deployment analysis apparatus or system or specifically by the network deployment analysis apparatus 260 of FIG. 2.

Referring to FIG. 4, actions pertaining to blocks 401 to 403 may be carried out as described in relation to block 301 to 303 of FIG. 3. After the information on the results of the downlink measurements is received in block 403, the network deployment analysis apparatus calculates, in block 404, for each downlink measurement corresponding to a particular cell, measured pathloss. Specifically, the calculation of the measured pathloss may be based on the downlink reference signal received power, transmission power provided by an access node for a corresponding cell and possibly (depending on the definition of pathloss) antenna gains of the terminal device and/or the access node (for the corresponding cell). The result of this calculation is a pathloss distribution for each cell. The pathloss distribution may, for example, comprise, for each of a plurality of pathloss bins, the number of measurements which correspond to a value (or a range of values) of that particular pathloss bin. The pathloss bins may have, for example, 1 dB separation. The pathloss distribution may be a discrete probability density function of pathloss.

The measured pathloss $PL_{meas}$ may be calculated in block 404, for example, using $$PL_{meas}=P_{TX}+G_{ant,TX}+G_{ant,RX}-L_{cable,TX}-L_{cable,RX}-RSRP,$$

where RSRP is the reference signal received power, $P_{TX}$ is the transmission power, $G_{ant,TX}$ is antenna gain of the transmitting antenna (i.e., an antenna of the access node), $G_{ant,RX}$ is antenna gain of the receiving antenna (i.e., an antenna of the terminal device), $L_{cable,TX}$ are the cable losses (cable attenuation) in the transmitter and $L_{cable,TX}$ are the cable losses (cable attenuation) in the receiver. All the quantities are given in dB. One or more of antenna gain and/or cable loss terms may be neglected in some cases. According to another definition of pathloss (see discussion below for further details), the measured pathloss may be calculated simply using $PL_{meas}=P_{TX}-RSRP.$ This definition differs from the earlier definition in that the antenna gains (and any possible cable losses) are included in the pathloss value. Also in this equation, all the quantities are given in dB.

The network deployment analysis apparatus determines, in block 405, for each cell, maximum allowed pathlosses in the wireless communications network of the first type and in the wireless communications network of the second type for satisfying a pre-defined Quality of Service, QoS, criterion (e.g., a pre-defined user throughput). This determining may be based on link budget information maintained in the database.

The determining of the maximum allowed pathlosses may take into account the following factors. Generally, pathloss PL is defined as $PL=P_{TX}-P_{RX}$, where $P_{TX}$ is the transmission power and $P_{RX}$ is the received power (e.g., RSRP). The measurement points for both $P_{TX}$ and $P_{RX}$ may vary in this context. For example, in a transmitter the measurement point may be right after the transmitter before the antenna(s) and the cables connecting to the antenna (i.e., excluding cable losses and antenna gains) according to a first pathloss definition. According to a second pathloss definition, the measurement point may be located after the antenna so that cable losses and antenna gain are included. Said definitions apply also in an analogous manner in the receiver. When calculating the pathloss from MDT data, the measurement point is the first one, while in link budget calculation (to be discussed below) the second one. Link budget provides information about the maximum allowed pathloss with a given QoS criteria. For example, QoS criteria may be user throughput, n Mbps, which corresponds to maximum allowed pathloss of m dB, n and m being positive real numbers. The following equation may be used to scale the pathloss from the link budget to correspond to measured pathloss values:

$PL_{meas}=PL_{lb}-G_{ant,TX}-G_{ant,RX}+L_{cable,TX}+L_{cable,RX},$ where $PL_{meas}$ is measured pathloss in dB (following the first pathloss definition) and $PL_{lb}$ is pathloss in the link budget in dB (following the second pathloss definition).

The network deployment analysis apparatus calculates, in block 406, for each cell, a pathloss difference between the wireless communications network of the first type and the wireless communications network of the second type. This calculation may be based on antenna gains and transmission powers provided by an access node for the cell in the wireless communications networks of the first type and the second type, antenna gains for a terminal device in the wireless communications networks of the first type and the second type and one or more pre-defined propagation parameters quantifying differences in radio propagation in the wireless communications network of the first and the second type. The pathloss difference may be written as $PL_{diff}=L_{prop,diff}-[(P_{TX,2}-P_{TX,1})+(G_{ant,TX,2}-G_{ant,TX,1})+ (G_{ant,RX,2}-G_{ant,RX,1})-(L_{cable,TX,2}-L_{cable,TX,1})- (L_{cable,RX,2}-L_{cable,RX,1})],$ where $PL_{diff}$ is the pathloss difference, subindices 1 and 2 refer, respectively, to the wireless communications networks of the first and second type and $L_{prop,diff}$ is the relative propagation loss. All the quantities are given in dB. The pathloss difference provides an estimation for how much larger the pathloss (according to the first definition) is for wireless communications network of the second type compared to the communications network of the first type.

The relative propagation loss $L_{prop,diff}$ measures the difference in signal attenuation due to the difference in the frequency bands employed by the wireless communications networks of the first and the second types. Here, it is assumed that the wireless communications network of the second type operates using a higher frequency band compared to the wireless communications network of the first type and thus the propagation losses are higher in the wireless communications network of the second type. For example, the wireless communications network of the first type may employ a LTE frequency band such as the 1.8 GHz frequency band (i.e., measurements may be performed using this frequency band), while the wireless communications network of the second type may employ a 5G frequency band such as the 3.5 GHz frequency band. Due solely to difference in free-space propagation loss ($L_{fs,diff}$), $L_{prop,diff}$ may be around 6-8 dB. Penetration losses (possibly indoor penetration losses) may be added on top of that ($L_{penetration,diff}$). Additional factors may be included as an additional loss term $L_{additional}$. For example, a reasonable estimate for the propagation loss with the aforementioned frequency bands may be about +10-15 dB. The above definition for the propagation loss may be written as an equation:

$L_{prop,diff}=L_{fs,diff}+L_{penetration,diff}+L_{additional},$ where all the quantities are given in dB.

The network deployment analysis apparatus may also calculate, in block 406, a pathloss distribution for each cell in the wireless communication network of the second type based on the pathloss distributions for each cell in the wireless communication network of the first type (calculated in block 404) and the pathloss difference (calculated in block 406). Each pathloss value of the pathloss distribution of the wireless communications network of the first type may be converted to a corresponding value for the wireless communications network of the second type simply following $PL_2=PL_1+PL_{diff}$, where are $PL_1$ and $PL_2$ are pathloss values in dB for a given downlink measurement in the wireless communications networks of the first and second type, respectively.

The network deployment analysis apparatus calculates, in block 407, coverage with the wireless communications network of the first type and with the wireless communications network of the second type when a corresponding cell is deployed by comparing each pathloss distribution of the wireless communication network of the first type to the maximum allowed pathloss for the wireless communications network of the first type and to the maximum allowed pathloss for the wireless communications network of the second type taking into account the pathloss difference. Alternatively, the coverage by the wireless communications network of the second type when a corresponding cell is deployed may be calculated by comparing each pathloss distribution of the wireless communication network of the second type (if calculated in block 406) to the maximum allowed pathloss for the wireless communications network of the second type. The coverage may be calculated as a percentage value or specifically as a percentage value given by a cumulative distribution function (defined by the pathloss distribution) when using a maximum allowed pathloss as input.

Finally in block 408, the network deployment analysis apparatus calculates, for each cell, the traffic absorption capability as a difference (or a ratio) of the coverage by the wireless communications network of the first type and the coverage by the wireless communications network of the second type when a corresponding cell is deployed.

The network deployment analysis apparatus outputs, in block 409, values of the traffic absorption capability and possibly (intermediary) results of some of the other calculations described above to a user device (of the network planner). Consequently or subsequently, the results of the calculating may be displayed on a screen of the user device.

According to an embodiment, the information outputted to the user device in block 409 may comprise, for each sector or cell, one or more of the following: a connection identifier (CID) (e.g., 171266), mode (e.g., fixed mode), maximum allowed pathloss for the wireless communications network of the first type (e.g., 122 dB), maximum allowed pathloss for the wireless communications network of the second type when the corresponding cell is deployed (e.g., 128 dB), the coverage with the wireless communications network of the first type (e.g., 91.47%), the coverage with the wireless communications network of the second type taking into account the pathloss difference (e.g., 96.68%), traffic absorption capability (e.g., −5 db) and the total sample count (e.g., 27 989 348). The exemplary values given in the parentheses may correspond to the same cell.

In some embodiments, the calculating of the one or more values of the traffic absorption capability as described in relation to block 304 or blocks 403 to 409 may be performed separately for uplink and downlink (but still based in both cases on the same downlink measurements). Obviously, parameters such as pathloss and pathloss difference are equally valid in uplink and downlink though at least link budget (and consequently the pre-defined QoS criterion) may be defined differently for uplink and downlink leading to differing maximum allowed pathloss values.

Figure 5:
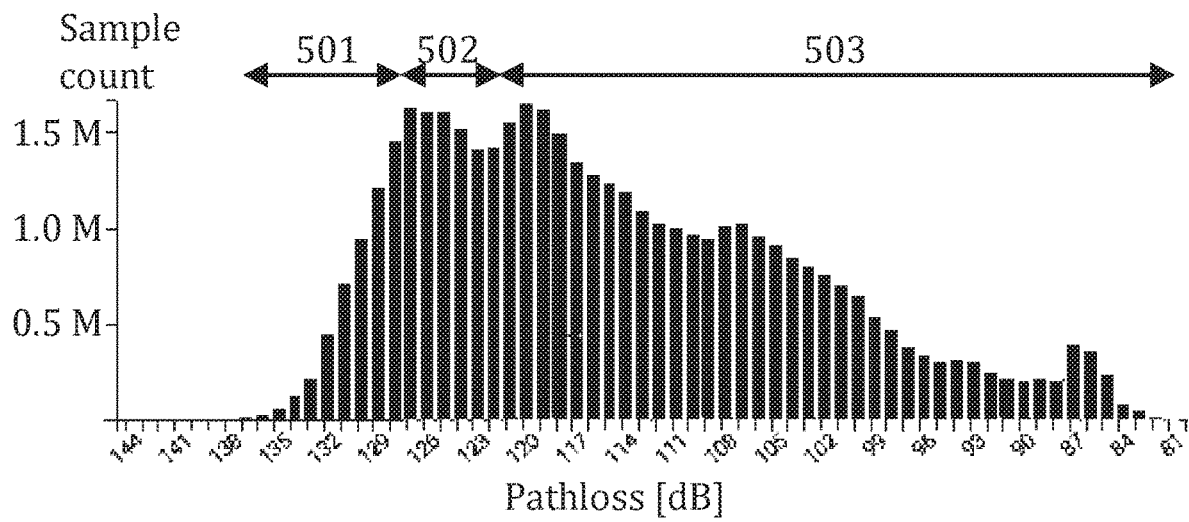
FIGS. 5, 7 and 9 illustrate exemplary output provided by processes according to embodiments.

FIG. 5 illustrates an example of a calculated pathloss distribution which may be outputted in block 409 of FIG. 4. The pathloss (in the wireless communications network of the first type) is presented on the x-axis (i.e., horizontal axis) and the number of samples on the y-axis (i.e., vertical axis). Three different sections or pathloss ranges 501, 502, 503 are indicated with arrows. The first section 501 represents the area where pathloss samples of the wireless communications networks of the first type and corresponding pathloss samples corresponding to the wireless communications networks of the second type (e.g., 5G and LTE networks) are below their respective link budget criteria (i.e., path loss criteria). The second section 502 represents the pathloss range where the wireless communications networks of the first type still operates within its link budget, but pathloss for the wireless communications networks of the second type would not meet the pathloss criteria derived from its link budget. The third section 503 represents the pathloss range where both wireless communications networks fulfill their respective link budget criteria.

Figure 6:
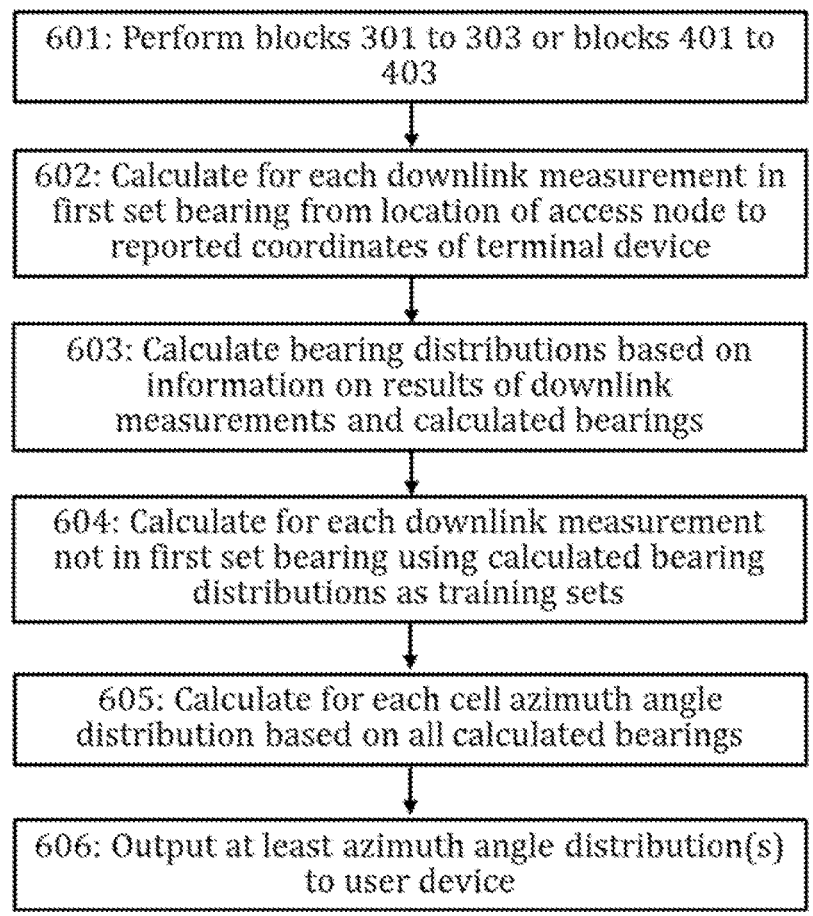

To fully benefit from massive MIMO configuration (i.e., MIMO using a very large number of antenna elements) enabled by, for example, 5G communications networks, users (i.e., terminal devices) should be spread out as much as possible in angular domain from the point of view of the antenna(s) of the access node. If all the users are aligned along a single direction, massive MIMO will only provide antenna gain, but cannot separate the beams to individual users. In planning 5G communications networks (or other future networks employing MIMO) to replace existing wireless communications networks, it would, thus, be beneficial to know before deployment which access node locations (or cell sites) would benefit the most from the MIMO functionality provided by the 5G communications network, that is, in which cell sites the terminal devices are most spread out on average in angular domain from the point of view of the antenna(s) of the access node. FIG. 6 illustrates a process according to embodiments for implementing such a functionality. Similar to the previous illustrated embodiments, the illustrated process of FIG. 6 may be performed by a network deployment analysis apparatus or system or specifically by the network deployment analysis apparatus 260 of FIG. 2.

Referring to FIG. 6, it may be initially assumed that the information on the wireless communications network of the first type and/or the second type is maintained in the database (as described in relation to block 301 of FIG. 3 or 401 of FIG. 4). Specifically, the information on the wireless communications network of the first type may comprise at least information on antenna bearings associated with access nodes in the wireless communications network of the first type. Further, the network deployment analysis apparatus may also perform, in block 601, actions as described in relation to blocks 302, 303 of FIG. 3 or 402, 403 of FIG. 4. The information on results of the downlink measurements (as described in relation to block 303 of FIG. 3 or block 403 of FIG. 3) may comprise, specifically in this embodiment, also a set of coordinates of terminal devices corresponding to a first set of downlink measurements. The coordinates may be GPS coordinates and the terminal devices associated with said coordinates may correspond to terminal devices which were GPS-enabled at the time of the downlink measurements in the first set. The number of the downlink measurements in the first set may be relative small (e.g., 5%) compared to the total number of downlink measurements. The information on results of the downlink measurements may also comprise information on one or more cells associated with each downlink measurement which may comprise, for example, a set of cell identifiers of one or more different types (e.g., a cell identifier, a radio channel identifier, RSRP and/or pathloss) and timing advance information for each downlink measurement. Each set of cell identifiers may comprise altogether one or more cell identifiers (i.e., one of each type of cell identifier).

The network deployment analysis apparatus calculates, in block 602, for each downlink measurement in the first set, a bearing from the location of the access node to the reported coordinates of a corresponding terminal device. The bearing may correspond to a bearing vector or a bearing angle. Each calculated bearing (or associated downlink measurement sample) may be associated with (or mapped to) a timing advance bin and a set of cell identifiers based on the information on the results of the downlink measurements. Timing advance is defined to correspond to the length of time a signal takes to reach an access node from the terminal device (or vice versa).

As multiple downlink measurement samples may be associated with the same cell, timing advance bin and set of cell identifiers, the network deployment analysis apparatus calculates, in block 603, for each unique combination of a cell, a timing advance bin and a set of cell identifiers in the first set of downlink measurements, a bearing distribution based on the information on the results of the downlink measurements and calculated bearings. The bearing distribution may define a probability density function of a bearing (defined, e.g., via an azimuthal angle) between an access node and a terminal device. Specifically, each bearing distribution may be a discrete probability density function where each bearing bin represents the probability that a sample arrives at a particular (azimuthal) angle range (e.g., 5° to 10°). For example, 1°, 2° or 5° interval may be employed.

As mentioned above, the coordinate information may be available only for some (possibly a minority) of the downlink measurements. To evaluate the bearings associated with the rest of the downlink measurements, the network deployment analysis apparatus calculates, in block 604, for each downlink measurement for which coordinate information is unavailable (i.e., not in the first set), a bearing by using the calculated bearing distributions as training sets. For each downlink measurement for which coordinate information is unavailable, the set of cell identifiers of said downlink measurement may be compared with each set of cell identifiers associated with a training set (associated with a particular access node and timing advance bin of said downlink measurement). If a match is found, the bearing for said downlink measurement may be determined based on the bearing distribution of the matching training set.

Based on all the calculated bearings associated with the downlink measurements (calculated in blocks 602 and 604), the network deployment analysis apparatus calculates, in block 605, for each cell, an azimuth angle distribution. The azimuth angle distribution may be defined as a discrete probability density function of an angle (e.g., the azimuth angle). Finally, the network deployment analysis apparatus outputs, in block 606, each calculated azimuth angle distribution to the user device for further facilitating the planning of the wireless communications network of the second type. Specifically, the calculated azimuth angle distribution(s) may facilitate the decision making regarding massive MIMO antenna deployments for the wireless communications network of the second type.

In some embodiments, the network deployment analysis apparatus further calculates one or more of the following metrics based on the azimuth angle distribution: a ratio of a maximum number of samples in a bin of the azimuth angle distribution to an average number of samples in a bin of the azimuth angle distribution, the number of bins of the azimuth angle distribution having the number of samples larger than a pre-defined value, an azimuth angle cumulative distribution function, an azimuth angle variance (or azimuth angle standard deviation) and an instant azimuth angle for a pre-defined time frame. The instant azimuth angle may be calculated at least if a calculated azimuth angle variance has a value smaller than a pre-defined value. In some embodiments, the network deployment analysis apparatus may calculate, for each cell, a timing advance distribution (i.e., a discrete probability density function of the timing advance). Any of the aforementioned calculations may be outputted to the user device in block 606.

In the following, the process of FIG. 6 is discussed specifically in view of embodiments where the measurements performed in the wireless communications network of the first type are MDT measurements. The definitions as described above in relation to FIG. 6 apply also in this case unless otherwise stated. In such embodiments, the information on results of the downlink measurements (i.e., the MDT data set) may comprise all or at least some of the following elements: source cell identifier, source cell RSRP and/or RSRQ source cell TA information, target cell N PCI and EARFCN, target cell N RSRP and/or RSRQ and GPS coordinate information. The source cell may be defined as the current serving cell at the time of measurement while target cells may be defined as all the other measured cells (identified in LTE by PCI and EARFCN). Source cell may be identified by the source cell identifier (specifically, by E-UTRAN ID further abbreviated as ECI). RSRQ may be defined according to RSRQ=$N_{PRB}$*RSRP/RSSI, where RSSI is the Received Signal Strength Indicator and $N_{PRB}$ is the number of used physical resource blocks. The RSSI is a measurement of the power present in the received radio signal. The source cell TA information may comprise information on at least the distance from which each sample is received (i.e., the TA value). TA value may be reported with a 78 meter resolution defined according to d[m]=78*N, where N is the TA class which may be defined to have values N=0 . . . 9. EARFCN (E-UTRA Absolute Radio Frequency Channel Number) provides means for obtaining information on the different channels available and it has an integer value (e.g., between 0 and 65535). EARFCN uniquely identifies the (LTE) frequency band and carrier frequency. PCI is an integer providing an identification of a cell at physical layer. The set of cell identifiers, as discussed above, may comprise in this case at least the target cell N PCI and EARFCN.

Similar to as discussed above, the network deployment analysis apparatus may initially calculate (in block 602) bearings from the antenna coordinates to the reported (GPS) coordinates of the terminal devices (when available) in each TA bin in each source cell. Each bearing or TA class may be tagged with target cell PCI and EARFCN information. In other words, TA class N=0 may be tagged with target cell 0 PCI and EARFCN information, TA class N=1 may be tagged with target cell 1 PCI and EARFCN information and so on. There may be up to nine target cells in each source cell. The combination of PCI and EARFCN may represent a finger print or a training set for the bearing vector or form a part of the training set. Additionally, also RSRP and/or pathloss may be used for fingerprinting in each target cell. As the same combination of PCI and EARFCN may be potentially found in multiple angles, a discrete probability density function for each combination of PCI and EARFCN may be formed (block 603). Each bearing distribution may be denoted as p(a), where the value of a is a discrete value, for example, with 1-5° sampling interval and the following applies (assuming 1° sampling interval): $\Sigma_{\alpha=1}^{360} p(\alpha)=1$.

When a downlink measurement sample without the coordinate information is detected, target cell PCI and EARFCN information is correlated (or compared) with the training set in each source cell per TA bin (block 604). When a match is found, the bearing distribution is taken from the training set and applied to the downlink measurement sample (block 604). The resulting samples are binned at the pre-defined interval, for example at 5° interval, and the total count is calculated for each bin to form an azimuth angle distribution for each source cell (block 605). Each azimuth angle distribution may be outputted to the user device as discussed above in relation to block 606.

Figure 7:
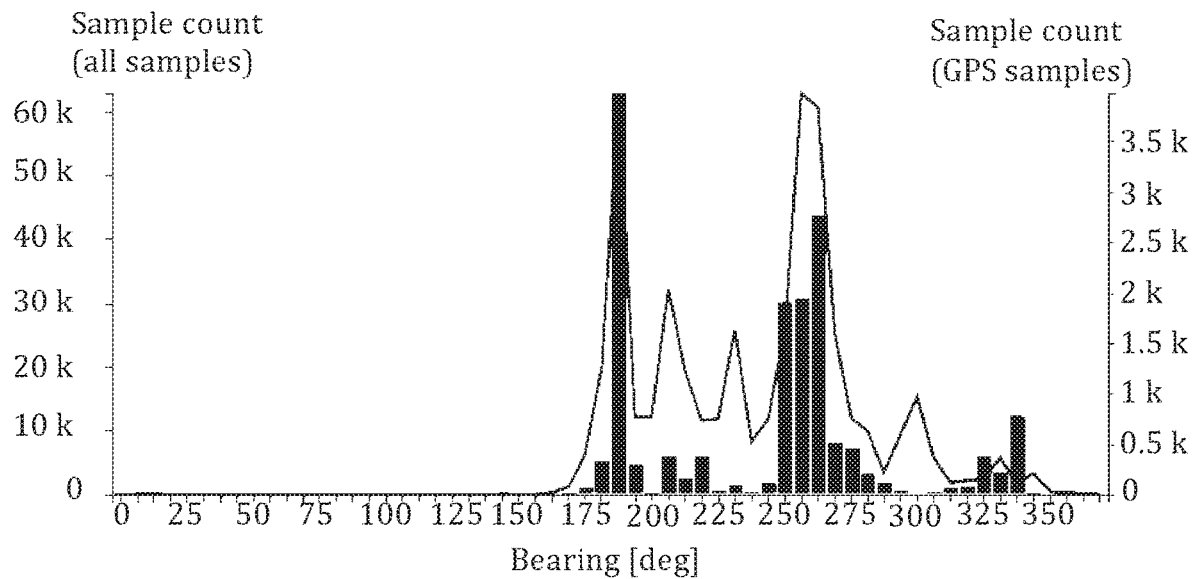

FIG. 7 illustrates an example of an azimuth angle distribution calculated based on just the downlink measurement samples for which GPS information is available (illustrated with a solid line) and an azimuth angle distribution calculated based on all the downlink measurement samples according to the process discussed in relation to FIG. 6 (illustrated with bars). The bearing (i.e., azimuthal angle) is presented on the x-axis (i.e., horizontal axis) and the sample count on the y-axis (i.e., vertical axis) using separate scales for the two cases. Antenna bearing in this example is 240° and the traffic peaks as a function of bearing appear around 210° and 270°.

Figure 8:
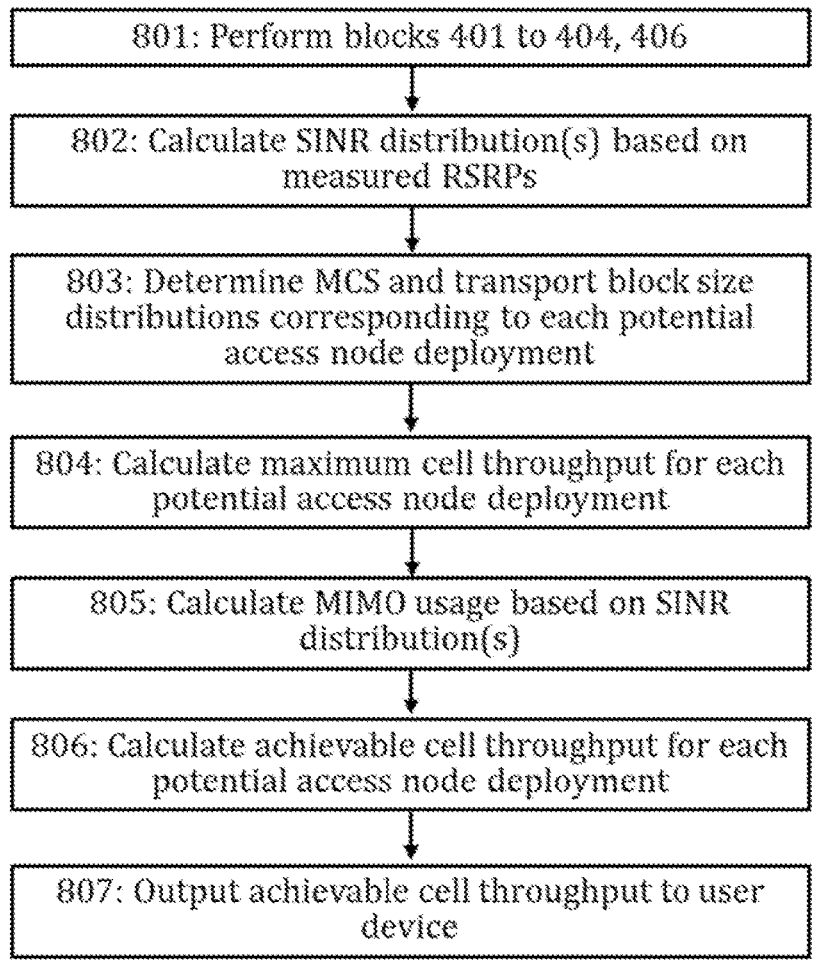

Another potential functionality of the network deployment analysis apparatus for further facilitating the network planning for the wireless communications network of the second type (e.g., 5G network) involves using the results of the downlink measurement for assessing the cell capacity (e.g., active cell throughput) that the new cell (i.e., new deployment) may provide. FIG. 8 illustrates a process according to embodiments for implementing such a functionality. Similar to the previous illustrated embodiments, the illustrated process of FIG. 8 may be performed by a network deployment analysis apparatus or system or specifically by the network deployment analysis apparatus 260 of FIG. 2.

Referring to FIG. 8, it may be initially assumed that the information on the wireless communications network of the first type and/or the second type is maintained in the database (as described in relation to block 301 of FIG. 3 or 401 of FIG. 4). Specifically, the information on the wireless communications network of the first type may comprise at least information on antenna bearings associated with access nodes in the wireless communications network of the first type. Further, the network deployment analysis apparatus may also perform, in block 801, actions as described in relation to blocks 402, 403, 404, 406 of FIG. 4. The information on results of the downlink measurements may comprise information as described in relation to any of FIGS. 3, 4 and 6.

After receiving the information on results of downlink measurements (according to block 403 of FIG. 4) and calculating pathloss distributions for each cell (according to block 404 of FIG. 4) and corresponding pathloss differences between the wireless communications networks of the first and second types (according to block 406 of FIG. 4), the network deployment analysis apparatus calculates, in block 802, for each cell in the wireless communications network of the second type, a signal-to-interference-plus-noise (SINR) distribution based on the information on results of downlink measurements (specifically, based on at least pathloss distributions and the pathloss difference). The SINR distribution may be a discrete probability density function of SINR. In some embodiments, a signal-to-noise (SNR) distribution may be calculated instead of the SINR distribution.

In some embodiments, the calculation of each SINR distribution in block 802 may comprise the following steps. First, the network deployment analysis apparatus calculates, for each downlink measurement, a downlink f-factor based on the pathloss values corresponding to the reference signal transmitted by the serving cell and to each non-serving cell in the wireless communications network of the second type. Said pathloss values (defined according to the first pathloss definition) may be calculated based on the pathloss distributions in the wireless communications network of the second type (calculated as described in relation block 406 of FIG. 4). The downlink f-factor $f_{DL}$ may be calculated according to:

$$f_{DL} = \frac{\sum_{i \neq Serving} \left(\frac{1}{PL_i}\right)}{\frac{1}{PL_{Serving}}},$$

where $\sum_{i \neq Serving}(1/PL_i)$ is a summation of all inverse absolute pathloss values corresponding to measurements by a terminal device (within a particular time frame) excluding $1/PL_{Serving}$ which is the inverse absolute pathloss value corresponding to the serving cell. Specifically, the absolute pathloss values $PL_i$ and $PL_{Serving}$ correspond to pathloss values in the wireless communications network of the second type. Second, the network deployment analysis apparatus calculates a signal-to-interference-plus-noise value for each downlink measurement (i.e., for each downlink f-factor value). Each SINR value may be calculated according to:

$$SINR = \frac{P_{serving}}{P_{serving} * f_{DL} + kTB},$$

where $P_{serving}$ is a power received by a terminal device from a serving cell in the wireless communications network of the second type (calculated based on the pathloss distributions in the wireless communications network of the second type and properties of the transmitting access node and the receiving terminal device), k is the Boltzmann's constant (i.e., approximately $1.38064852 \times 10^{-23}$ J/K), T is a temperature in kelvins and B is a bandwidth. If thermal noise (i.e., the term kTB) is excluded, the signal-to-interference-plus-noise ratio may be defined simply as $SINR=1/f_{DL}$. The above equations for SINR give an absolute value for the SINR. The decibel value for the SINR may be calculated according to $SINR[dB]=10*\log_{10}(SINR)$. Thirdly, the network deployment analysis apparatus combines or aggregates the SINR values for each cell to form a SINR distribution for each cell.

After the calculating of the SINR distribution(s), the network deployment analysis apparatus determines, in block 803, a modulation and coding scheme, MCS, distribution and a corresponding transport block size distribution to be used by the wireless communications network of the second type for achieving each SINR distribution. The MCS and transport block size distributions may be discrete probability density functions of the MCS index and the transport block size. The MCS index value is a unique reference number given for a particular combination of number of spatial streams, modulation type and coding rate. The transport block size provides the number of bits that can be transmitted per transport block. Each MCS index may be mapped to a particular transport block size.

Based on the MCS and/or SINR distribution and the transport block size distribution, the network deployment analysis apparatus calculates in block 804, for each cell, a maximum cell throughput if a corresponding cell deployment is carried out in the wireless communications network of the second type based on the MCS distribution and the transport block size distribution. The effect of MIMO may be neglected in this calculation.

The (final) achievable cell throughput taking into account also the MIMO functionality may be calculated by first evaluating MIMO usage. Thus, the network deployment analysis apparatus calculates, in block 805, for each cell, a MIMO usage as a function of the SINR based on the SINR distribution(s). In other words, a MIMO usage value (e.g., a percent value) may be assigned to each SINR bin. Based on the MCS and/or SINR distribution, the transport block size distribution and the MIMO usage, the network deployment analysis apparatus calculates, in block 806, the achievable cell throughput.

Finally, the network deployment analysis apparatus outputs, in block 807, one or more of the calculation results calculated in any of blocks 802 to 806 to the user device for further facilitating the planning of the wireless communications network of the second type. For example, the maximum cell throughput and/or the achievable cell throughput may be outputted in block 807.

In some embodiments, one or more of the calculations described in blocks 802 to 806 may be omitted.

Figure 9:
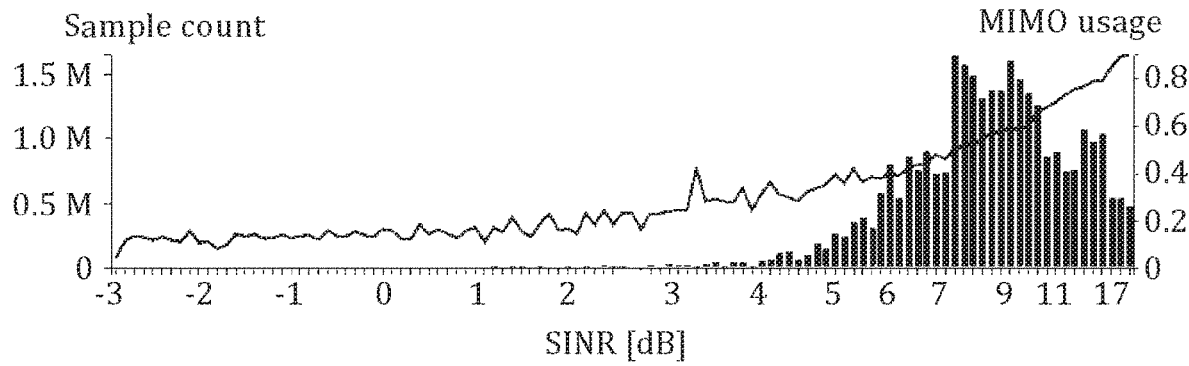

FIG. 9 illustrates an example of a SINR distribution and a corresponding MIMO usage calculated as discussed in relation to FIG. 8. The SINR distribution is illustrated with bars and the MIMO usage with a solid line.

Figure 10:
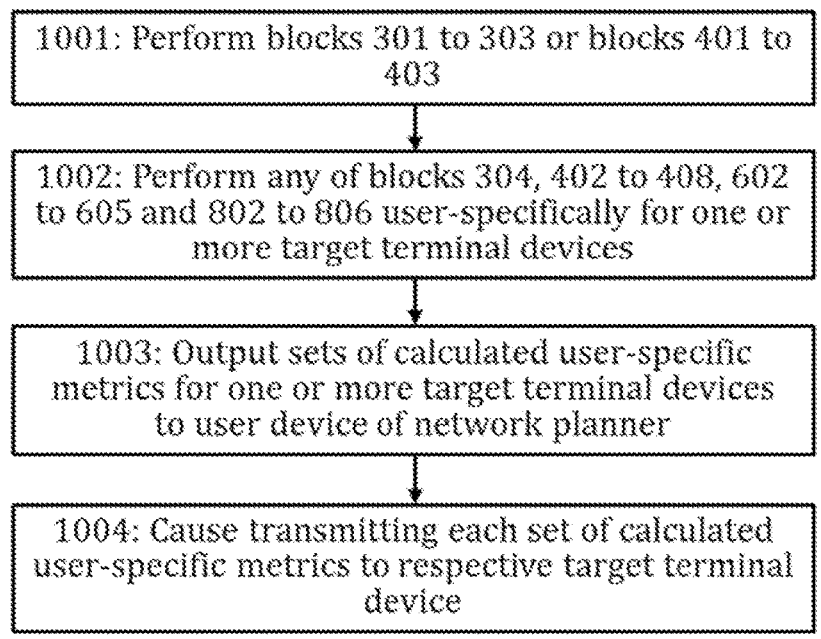

In addition or alternative to the cell/sector-specific analysis discussed in relation to FIGS. 3 to 8, the network deployment analysis apparatus may also perform, in some embodiments, user-specific analysis based on the results of the downlink measurements. FIG. 10 illustrates a process according to embodiments for implementing such a functionality. Similar to the previous illustrated embodiments, the illustrated process of FIG. 10 may be performed by a network deployment analysis apparatus or system or specifically by the network deployment analysis apparatus 260 of FIG. 2. In the user-specific embodiments, the one or more cell deployments may already be implemented or at least planned to be implemented (as opposed to being only potential cell deployment as in previous embodiments).

Referring to FIG. 10, the network deployment analysis apparatus may perform, in block 1001, actions as described in relation to blocks 301, 302, 303 of FIG. 3 or blocks 401, 402, 403 of FIG. 4. The information on the wireless communications network of the first type and/or the second type maintained in the database may be defined as described in relation to any previous embodiment. The information on results of the downlink measurements may comprise information as described in relation to any of FIGS. 3, 4 and 6. To enable the user-specific analysis, the information on the results of the downlink measurements may further comprise user identification information allowing the identification of individual users and type of the terminal device. The user identification information may comprise, for example, International Mobile Subscriber Identity (IMSI) and/or Type Allocation Code (TAC) code.

The network deployment analysis apparatus performs, in block 1002, any of the calculations discussed in relation to previous embodiments (i.e., embodiments discussed in relation to FIGS. 3 to 8) user-specifically (i.e., terminal device-specifically) for all terminal devices which performed downlink measurements (or a subset therein) based on the user identification information. The term "user" may refer specifically here to a subscriber (of the wireless communications network of the first type), as opposed to a network planner as discussed earlier. In other words, the network deployment analysis apparatus may perform any of blocks 304 of FIGS. 3, 402 to 408 of FIGS. 4, 602 to 605 of FIGS. 6 and 802 to 806 of FIG. 8 user-specifically for the plurality of terminal devices performing downlink measurements (or for at least one of the plurality of terminal devices performing downlink measurements). The result is a set of user-specific calculation results for each terminal devices (or equally a set of user-specific metrics for each terminal device). Each user-specific calculation result may correspond to a single value or a set of values (a distribution). A user-specific calculation result may also quantify a calculated distribution with a single value by providing, e.g., an average value, a median value, a maximum value or a minimum value. For example, the network deployment analysis apparatus may perform the analysis described in relation to block 304 of FIG. 3 or blocks 402 to 408 of FIG. 4 user-specifically, i.e., calculate one or more values of traffic absorption capability associated with one or more cell deployments for each individual terminal device. The set of user-specific calculation results for each terminal device may, also or alternatively, comprise one or more quantities and/or metrics used in any of the aforementioned calculations (i.e., used as inputs in said calculations).

For example, each set of user-specific (or terminal device-specific) calculation results may comprise one or more calculation results of the following types: number of downlink measurements, RSRP, timing advance, transmission time interval, traffic absorption capability, pathloss distribution, maximum allowed pathloss, pathloss difference, coverage, bearing, bearing distribution, azimuth angle distribution, SNR distribution, SINR distribution, MCS distribution, transport block size distribution, maximum cell throughput, MIMO usage, achievable cell throughput, a ratio of a maximum number of samples in a bin of the azimuth angle distribution to an average number of samples in a bin of the azimuth angle distribution, the number of bins of the azimuth angle distribution having the number of samples larger than a pre-defined value, an azimuth angle cumulative distribution function and an azimuth angle variance and an instant azimuth angle for a pre-defined time frame. Here, each quantity may be defined as described in relation to above embodiments, apart from being calculated user-specifically (i.e., terminal device-specifically). Any of listed quantities may be provided as an average value, a median value, a maximum value and/or a minimum value and/or as a distribution. A variance or standard deviation value may also be provided for any of the listed quantities/distributions. One or more of the quantities may be provided separately for uplink and downlink.

After sets of user-specific calculation results have been calculated in block 1002, said sets of user-specific calculation results may be outputted, in block 1003, by the network deployment analysis apparatus to the user device of a network planner, similar to as discussed in relation earlier embodiments. Moreover, the network deployment analysis apparatus causes transmitting, in block 1004, one or more sets of user-specific calculation results to one or more respective target terminal devices using the wireless communications network of the first type (i.e., using the plurality of access node in the wireless communications network of the first type). In other words, the user (i.e., a subscriber) may be provided information on how he/she would benefit from the wireless communications network of the second type. The one or more target terminal devices may be selected based on one or more user-specific calculation results of particular type, that is, based on values of one or more user-specific metrics. For example, the one or more target terminal devices may comprise terminal devices for which a particular metric defined in the set(s) of user-specific calculation results (e.g., user-specific traffic absorption capability) or an average or maximum of a user-specific distribution is above a pre-defined threshold. To give another example, the one or more target terminal devices may comprise a pre-defined number of terminal devices for which a cell deployment of the wireless communications network of the second type is determined to provide the greatest benefit based on calculated sets of user-specific calculation results. For example, the pre-defined number of target terminal devices may provide a highest value for a certain user-specific metric defined in the set(s) of user-specific calculation results. For example, the one or more target terminal devices may comprise terminal devices of users for which data consumption is above a pre-defined limit and which are located in good RF conditions and are stationary. Such stationary terminal devices may correspond, for example, to (LTE) modems or data sticks. The one or more target terminal devices may correspond to potential early adopters of the wireless communications network of the second type (e.g., 5G).

In some embodiments, the information provided to the user device and/or to the one or more target terminal devices in blocks 1003, 1004 may be displayed, upon reception, on a screen of the user device and/or screens of the one or more target terminal devices, respectively.

User level analysis allows the identification of the users which are most impacted by a new deployment in the wireless communications network of the second type (e.g., a deployment of a 5G cell). The user-specific analysis provides also the possibility to identify the types of the terminal devices. Together with the user information, this may allow additional use case development, for example, targeted marketing campaigns. For example, the users of the terminal devices (i.e., subscribers) who suffer from insufficient signal level/quality, that is, poor (quality of) service, may be informed automatically of incoming 5G cell deployment(s) or already deployed 5G cell(s) which would improve their quality of service.

The blocks, related functions, and information exchanges described above by means of FIGS. 2 to 10 in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 11:
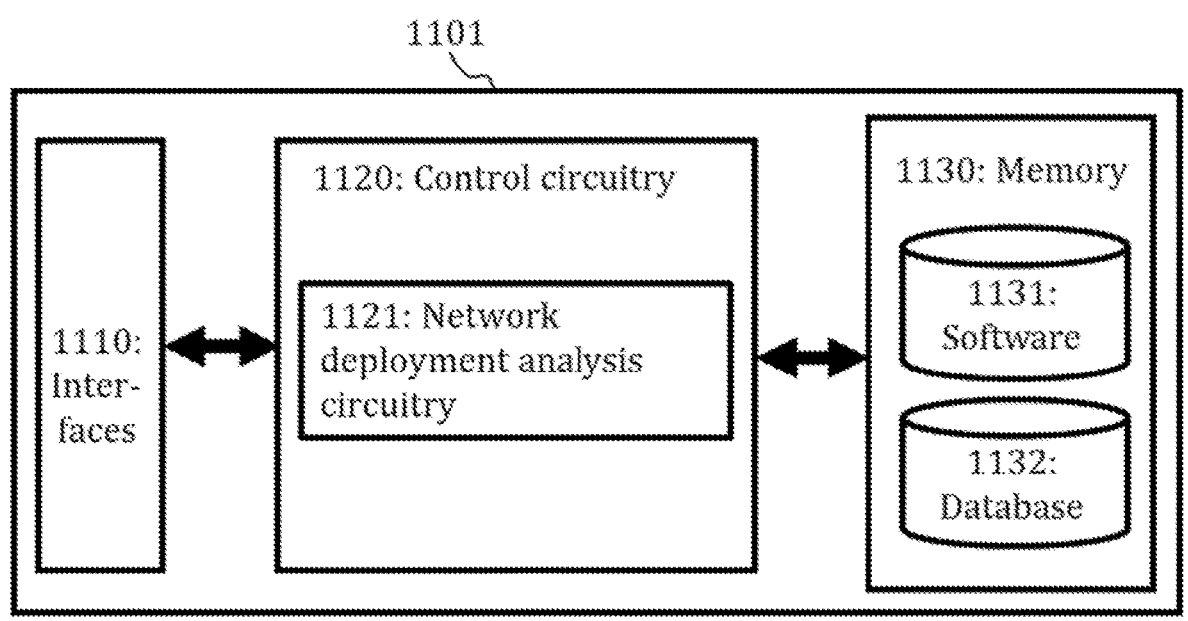
FIG. 11 illustrates an apparatus according to embodiments.

FIG. 11 provides a network deployment analysis apparatus 1101 according to some embodiments. Specifically, FIG. 11 may illustrate a network deployment analysis apparatus configured to carry out at least the functions described above in connection with performing measurements in a wireless communications network of the first type and calculating based thereon one or more values of metrics for evaluating different deployments in a wireless communications network of the second type. The network deployment analysis apparatus 1101 may be a network deployment analysis apparatus 260 of FIG. 2. The network deployment analysis apparatus 1101 may comprise one or more control circuitry 1120, such as at least one processor, and at least one memory 1130, including one or more algorithms 1131, such as a computer program code (software) wherein the at least one memory and the computer program code (software) are configured, with the at least one processor, to cause the network deployment analysis apparatus to carry out any one of the exemplified functionalities of the network deployment analysis apparatus described above, respectively. Said at least one memory 1130 may also comprise at least one database 1132.

Referring to FIG. 11, the one or more control circuitry 1120 of the network deployment analysis apparatus 1101 comprise at least network deployment analysis circuitry 1121 which is configured to perform analysis on different potential network deployments in the wireless communications network of the second type. To this end, the network deployment analysis circuitry 1121 of the network deployment analysis apparatus 1101 is configured to carry out functionalities described above by means of any of FIGS. 3 to 10 using one or more individual circuitries.

Referring to FIG. 11, the memory 1130 may be implemented using any suitable data storage technology, such as semiconductor based memory devices, flash memory, magnetic memory devices and systems, optical memory devices and systems, fixed memory and removable memory.

Referring to FIG. 11, the network deployment analysis circuitry 1101 may further comprise different interfaces 1110 such as one or more communication interfaces (TX/RX) comprising hardware and/or software for realizing communication connectivity according to one or more communication protocols. Specifically, the one or more communication interfaces 1110 may comprise, for example, interfaces providing a connection to the Internet and a core network of the wireless communications network of the first type and/or the second type (if already deployed). The one or more communication interface 1110 may provide the network deployment analysis apparatus with communication capabilities to communicate in a cellular communication system and enable communication between user devices (terminal devices) and different network nodes or elements and/or a communication interface to enable communication between different network nodes or elements, for example. The one or more communication interfaces 1110 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 10 or operations thereof.

Embodiments as described may also be carried out in the form of a computer process defined by a computer program or portions thereof. Embodiments of the methods described in connection with FIGS. 3 to 10 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A network deployment analysis apparatus comprising means for performing:
    maintaining, in a database, information on a wireless communications network of a first type and information on a wireless communications network of a second type, wherein the information on the wireless communications network of the second type comprises information on one or more potential cell deployments associated with one or more cells of the wireless communications network of the second type;
    causing performing downlink measurements on reference signals transmitted by one or more access nodes in the wireless communications network of the first type using a plurality of terminal devices in the wireless communications network of the first type;
    in response to receiving information on results of the downlink measurements comprising at least downlink reference signal received power measured by each terminal device of the plurality of terminal devices, calculating one or more values of traffic absorption capability associated with the one or more potential cell deployments based on the received information and the information on the wireless communications network of the first type and the second type, wherein the traffic absorption capability is defined as the amount of traffic volume a cell of a wireless communications network of the second type if deployed is able to absorb from the wireless communications network of the first type; and
    outputting results of the calculating to a user device for facilitating network planning of the wireless communications network of the second type.

2. The network deployment analysis apparatus of claim 1, wherein the information on the wireless communications network of the first type comprises information on one or more of
    configuration management data,
    locations of access nodes in the wireless communications network of the first type,
    antenna bearings associated with access nodes in the wireless communications network of the first type,
    a transmission power provided by an access node for a cell in the wireless communications network of the first type,
    an antenna gain for an access node in a wireless communications network of the first type,
    an antenna gain for a terminal device in a wireless communications network of the first type and
    a maximum allowed pathloss in a wireless communications network of the first type for satisfying a given Quality of Service, QoS, criterion, and the information on the wireless communications network of the second type comprises information on one or more of
    configuration management data,
    a transmission power provided by an access node for a cell in the wireless communications network of the second type,
    an antenna gain for an access node in a wireless communications network of the second type,
    an antenna gain for terminal device in a wireless communications network of the second type,
    a maximum allowed pathloss in a wireless communications network of the second type for satisfying a given QoS criterion and
    one or more pre-defined propagation parameters quantifying differences in radio propagation in wireless communications network of the first and the second type.

3. The network deployment analysis apparatus of claim 2, wherein the one or more pre-defined propagation parameters comprise one or more of a first propagation parameter for compensating for a difference in free-space loss, a second propagation parameter for compensating for a difference in penetration loss and a third propagation parameter for providing supplementary compensation.

4. The network deployment analysis apparatus according to claim 1, wherein the calculating of the traffic absorption capability comprises performing, for each cell associated with the one or more potential cell deployments, the following:
    calculating, for each downlink measurement corresponding to the cell, measured pathloss based on the downlink reference signal received power, transmission power of an access node for the corresponding cell and antenna gains of the terminal device and the access node for the corresponding cell to produce a pathloss distribution for the cell;
    determining maximum allowed pathlosses in a wireless communications network of the first type and in the wireless communications network of the second type for satisfying a pre-defined Quality of Service, QoS, criterion;
    calculating a pathloss difference between the wireless communications network of the first type and the wireless communications network of the second type based on antenna gains and transmission powers for an associated access node in the wireless communications networks of the first type and the second type, antenna gains for a terminal device in the wireless communications networks of the first type and the second type and one or more pre-defined propagation parameters quantifying differences in radio propagation in the wireless communications networks of the first and the second type;

calculating coverage with the wireless communications network of the first type and with the wireless communications network of the second type when a corresponding cell is deployed by comparing each pathloss distribution to the maximum allowed pathloss for the wireless communications network of the first type and to the maximum allowed pathloss for the wireless communications network of the second type taking into account the pathloss difference; and calculating the traffic absorption capability as a difference or a ratio of the coverage by the wireless communications network of the first type and the coverage by the wireless communications network of the second type when a corresponding cell is deployed.

5. The network deployment analysis apparatus according to claim 1, wherein the wireless communications network of the first type operates in a first frequency band and the wireless communications network of the second type operates in a second frequency band above the first frequency band.

6. The network deployment analysis apparatus according to claim 1, wherein the downlink measurements are performed as minimization of drive-tests, MDT, measurements or as operations support systems, OSS, performance management counter measurements.

7. The network deployment analysis apparatus according to claim 1, wherein the information on the wireless communications network of the first type comprises at least information on antenna bearings associated with access nodes in the wireless communications network of the first type and a set of coordinates of terminal devices corresponding to a first set of downlink measurements and the means are further configured to perform:

calculating, for each downlink measurement in the first set, a bearing from a location of a corresponding access node to coordinates of a corresponding terminal device;

calculating, for each unique combination of a cell, a timing advance bin and a set of cell identifiers in the first set of downlink measurements, a bearing distribution based on the information on the results of the downlink measurements and calculated bearings;

calculating, for each downlink measurement for which terminal device coordinate information is unavailable, a bearing by using the calculated bearing distributions as training sets;

calculating, for each access node, an azimuth angle distribution based on all the calculated bearings; and outputting each calculated azimuth angle distribution to the user device.

8. The network deployment analysis apparatus according of claim 7, wherein each set of cell identifiers comprises a Physical Cell Identifier, PCI and an Evolved-UTRA Absolute Radio Frequency Number, EARFCN, the downlink measurements are performed as minimization of drive-tests, MDT, measurements and the information on the results of the downlink measurements comprises one or more of a source cell identifier, source cell reference signal received power, reference signal received quality, source cell timing advance information, a target cell N PCI and a target cell N EARFCN, a target cell N reference signal received power, a target cell N reference signal received quality and Global Positioning System, GPS, coordinate information, N being an integer representing a timing advance class of a target cell.

9. The network deployment analysis apparatus according to claim 7, wherein the means are further configured to calculate one or more of the following metrics based on the azimuth angle distribution:

a ratio of a maximum number of samples in a bin of the azimuth angle distribution to an average number of samples in a bin of the azimuth angle distribution;

the number of bins of the azimuth angle distribution having the number of samples larger than a pre-defined value;

an azimuth angle cumulative distribution function;

an azimuth angle variance; and an instant azimuth angle for a pre-defined time frame, wherein the instant azimuth angle is calculated at least if a calculated azimuth angle variance has a value smaller than a pre-defined value.

10. The network deployment analysis apparatus according to claim 1, wherein the means are further configured to perform for each cell of the wireless communications network of the first type:

calculating a signal-to-interference-plus-noise ratio, SINR, distribution of the wireless communications network of the second type based on the results of downlink measurements;

determining a modulation and coding scheme, MCS, distribution and a corresponding transport block size distribution to be used by the wireless communications network of the second type to realize the SINR distribution;

calculating multiple input-multiple output, MIMO, usage as a function of signal-to-interference-plus-noise ratio based on the SINR distribution;

calculating an achievable cell throughput for a corresponding cell deployment in the wireless communications network of the second type based on the MCS or SINR distribution, the transport block size distribution and the MIMO usage; and outputting at least the achievable cell throughput to the user device.

11. The network deployment analysis apparatus according to claim 10, wherein the means are configured to perform the calculating of the SINR distribution by calculating SINR for each downlink measurement according to $$SINR = \frac{P_{serving}}{P_{serving} * f_{DL} + kTB}$$

wherein $P_{serving}$ is a power received by a terminal device from a serving cell in the wireless communications network of the second type, k is the Boltzmann's constant, T is a temperature in kelvins, B is a bandwidth and $f_{DL}$ is a downlink f-factor defined as $$f_{DL} = \frac{\sum_{i \neq Serving} \left(\frac{1}{PL_i}\right)}{\frac{1}{PL_{Serving}}},$$

wherein $\Sigma_{i \neq Serving}(1/PL_i)$ is a summation of all inverse absolute pathloss values corresponding to measurements by a terminal device excluding $1/PL_{Serving}$ which is the inverse absolute pathloss value of the serving cell.

12. The network deployment analysis apparatus according to claim 10, wherein the means are further configured to perform:
calculating, for each cell of the wireless communications network of the first type, a maximum cell throughput for a corresponding cell deployment in the wireless communications network of the second type based on the MCS distribution and the corresponding transport block size distribution; and
outputting also the maximum cell throughput for each cell of the wireless communications network of the first type to the user device.

13. The network deployment analysis apparatus according to claim 1, wherein the means are configured to perform one or more of the calculating steps user-specifically for each user of the plurality of terminal devices to produce a set of user-specific calculation results for each terminal device and to perform:
outputting each set of user-specific calculation results to the user device; or
causing transmitting one or more sets of user-specific calculation results to one or more respective target terminal devices using the wireless communications network of the first type.

14. The network deployment analysis apparatus according to claim 1, wherein the one or more target terminal devices comprise a pre-defined number of target terminal devices for which a cell deployment of the wireless communications network of the second type is determined to provide the greatest benefit based on calculated sets of user-specific calculation results or one or more terminal devices for which a particular metric defined in the one or more sets of user-specific calculation results is above a pre-defined threshold.

15. The network deployment analysis apparatus according to claim 13, wherein the means are configured to identify individual users of terminal devices in user-specific calculations based on International Mobile Subscriber Identity, IMSI, or Type Allocation Code, TAC.

16. The network deployment analysis apparatus according to claim 1, wherein the means are configured to perform at least the calculating of the one or more values of the traffic absorption capability separately for uplink and downlink.

17. The network deployment analysis apparatus according to claim 1, wherein the wireless communications network of the first type is a fourth generation, 4G, wireless communications network or a Long Term Evolution, LTE, wireless communications network or the wireless communications network of the second type is a fifth generation, 5G, wireless communications network.

18. The network deployment analysis apparatus according to claim 1, wherein the means comprise:
at least one processor; and
at least one memory including computer program code, the at least one memory and computer program code being configured, with the at least one processor, to cause the performance of the network deployment analysis apparatus.

19. A method comprising:
maintaining, in a database, information on a wireless communications network of a first type and information on a wireless communications network of a second type, wherein the information on the wireless communications network of the second type comprises information on one or more potential cell deployments associated with one or more cells of the wireless communications network of the second type;
causing performing downlink measurements on reference signals transmitted by one or more access nodes in the wireless communications network of the first type using a plurality of terminal devices in the wireless communications network of the first type;
in response to receiving information on results of the downlink measurements comprising at least downlink reference signal received power measured by each terminal device of the plurality of terminal devices, calculating one or more values of traffic absorption capability associated with the one or more potential cell deployments based on the received information and the information on the wireless communications network of the first type and the second type, wherein the traffic absorption capability is defined as the amount of traffic volume a cell of a wireless communications network of the second type if deployed is able to absorb from the wireless communications network of the first type; and
outputting results of the calculating to a user device for facilitating network planning of the wireless communications network of the second type.

20. A non-transitory computer readable medium having stored thereon instructions that, when executed by a computing device, cause the computing device to perform:
causing performing downlink measurements on reference signals transmitted by one or more access nodes in the wireless communications network of the first type using a plurality of terminal devices in the wireless communications network of the first type;
in response to receiving information on results of the downlink measurements comprising at least downlink reference signal received power measured by each terminal device of the plurality of terminal devices, calculating one or more values of traffic absorption capability associated with one or more potential cell deployments associated with one or more cells of a wireless communications network of a second type based on the received information, information on the wireless communications network of the first type and information on the wireless communications network of the second type comprising information on the one or more potential cell deployments, wherein the traffic absorption capability is defined as the amount of traffic volume a cell of a wireless communications network of the second type if deployed is able to absorb from the wireless communications network of the first type; and
outputting results of the calculating to a user device for facilitating network planning of the wireless communications network of the second type.

\* \* \* \* \*